United States Patent [19]

Blau, Jr. et al.

[11] 4,111,731
[45] Sep. 5, 1978

[54] METHOD OF MAKING A LIGHT EQUALIZER

[75] Inventors: Henry H. Blau, Jr., Wayland; Paul L. Kebabian, Somerville, both of Mass.

[73] Assignee: Environmental Research & Technology, Inc., Concord, Mass.

[21] Appl. No.: 530,673

[22] Filed: Dec. 9, 1974

Related U.S. Application Data

[62] Division of Ser. No. 458,124, Apr. 5, 1974, Pat. No. 3,887,262.

[51] Int. Cl.² .................... B29C 27/00; B32B 31/04
[52] U.S. Cl. .................................. 156/86; 156/294; 264/1; 264/112; 264/113
[58] Field of Search ............... 156/84, 85, 86, 242, 156/245, 288, 294, 296; 264/1, 2, 109, 112, 113, 120, 122, 123; 250/343, 345; 350/178, 204, 213, 233; 356/112

[56] References Cited

U.S. PATENT DOCUMENTS

| 3,198,059 | 8/1965 | Phaneuf et al. | 264/1 |
| 3,365,271 | 1/1968 | Carnall et al. | 350/178 |

*Primary Examiner*—Caleb Weston
*Attorney, Agent, or Firm*—Schiller & Pandiscio

[57] ABSTRACT

A method of making a light equalizer comprises the steps of selecting a powdered crystalline material capable of being compressed to form a body transparent to selective wavelengths of light. The material is compressed to a point short of complete transparency so as to provide a plurality of light scattering centers throughout the bulk of the body. A stack of the bodies are formed in which the bodies are disposed along a common axis. The exterior surfaces of the stack thus formed are covered with an internally reflective coating except for two opposite ends thereof, so that light of selected wavelengths transmitted through the stack will be substantially uniformly distributed at the output of the stack.

2 Claims, 7 Drawing Figures

METHOD OF MAKING A LIGHT EQUALIZER

This application is a division of our copending application Ser. No. 458,124 filed Apr. 5, 1974, now U.S. Pat. No. 3,887,262 for Stacked Equalizers.

The present invention relates to optical devices and more particularly to precision optics requiring a substantially uniform light source.

In order to achieve wavelength filtering in precision optical equipment, interference filters are often employed because the band-pass characteristics of the latter can be quite precisely tailored. This is particularly true in equipment, such as many types of analytical spectrophotometers, operating in the infrared. However, the characteristics of an interference filter depend upon the thickness of the films forming the filter, and these characteristics will change as the angle of incident light changes. This dependence of band-pass characteristics on the angle of incident light is largely due to the changes in the optical path length through each layer of film as the angle of incidence changes. Thus, for moderate changes of the angle from the normal, the effect is to shift the spectral characteristics of the filter toward shorter wavelengths. Despite the desirability of interference filters, this band-pass dependance upon the angle of incident light can seriously impair or degrade the precise function required of an optical system.

For example, in correlation spectrometers of the type disclosed particularly in U.S. Pat. No. 3,723,731 issued March 27, 1973 to H. H. Blau, Jr., or in spectrometers of the type employing beam splitters as disclosed in U.S. Pat. No. 3,488,491 issued Jan. 16, 1972 to M. Schuman, the systems may involve either a wide angle source of light as the primary input or may involve a secondary source of light as a calibration source. In either event, the light from either the different sources or from the various points on a single source will be incident upon an interference filter in the optical train at different angles. The transmission by the filter will then vary according to the source or the position of the points on a source, as the case may be. In a spectrophotometer which depends upon the simultaneous balance of light transmitted along separate absorbing and non-absorbing (or reference) paths to respective detectors, or which depends upon the balance between the sequential transmissions of light through absorbing and reference paths to a single detector, variations in the ratio of the detected intensities, due to transmission changes in the input filter, will impair the precision of the analysis performed by the spectrophotometers.

A principal object of the present invention is therefore to provide, for a filter having band-pass characteristics dependent upon the angle of incidence of input light, an input optical system which renders the filter relatively insensitive to the input angle of light to the optical system.

Yet another important object of the present invention is to provide a spectrophotomeric device employing an interference filter which device is substantially insensitive to the angular characteristics of input radiation to the device.

Other objects of the present invention will in part appear obvious and will in part appear hereinafter. The invention accordingly comprises the apparatus possessing the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the present invention, reference should be had to the following detailed description taken in connection with the accompanying drawings wherein.

Figure 1:
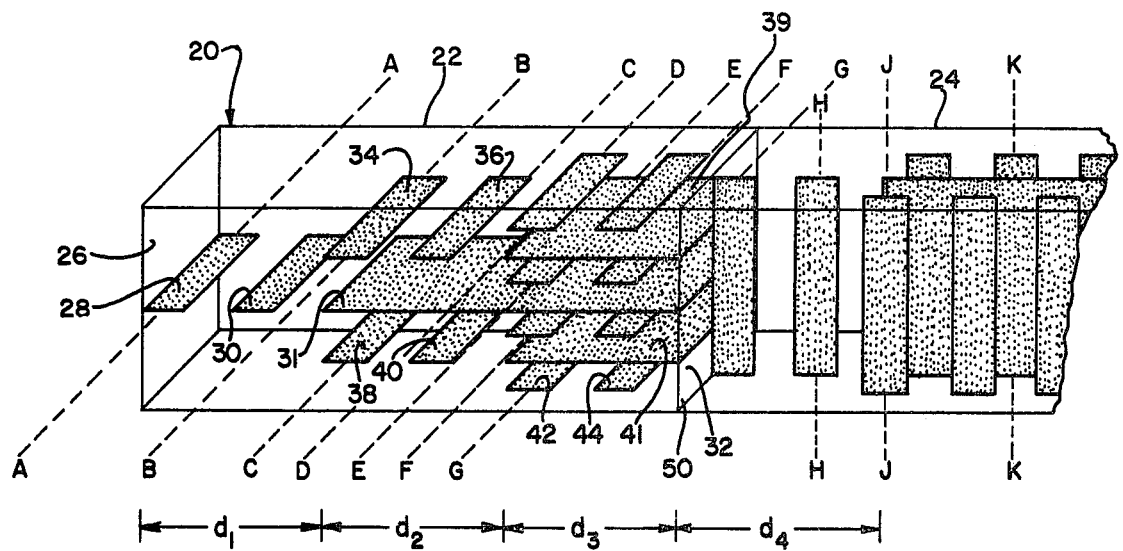
FIG. 1 is a perspective view showing the interior structure of an equalizer device of the present invention.

Generally the foregoing and other objects of the present invention are achieved by the provision of two optical devices or elements in sequence as an input to an interference filter.

The first optical device, preferably termed an equalizer, provides that each point or area element of its output aperture substantially exhibits the same emission intensity as every other point, regardless of the angular width of the source or even the number of sources providing input radiation to the input aperture of the device. In other words, notwithstanding the nature of the distribution of input light to the device, the entire output aperture of the equalizer will be at one uniform intensity which is substantially the average intensity of all of the input radiation. Positioned adjacent the output aperture of the equalizer is a collimator, the output aperture of the equalizer being spaced from the collimator by the focal length of the latter. The output of the collimator provides the input beam to the interference filter. As will be explained later, the total structure as thus described is relatively insensitive to angular and spatial intensity variations of the input light to the system.

The spectrophotometer of the invention includes the foregoing three elements, equalizer, collimator and filter as an input to a beam splitter.

Generally, the equalizer of the present invention comprises an optical system having an input aperture, an output aperture, and means for equalizing the distribution of light energy across the entire output aperture.

The input and output apertures are not necessarily either the same size or shape, but for most practical situations they will be the same. In an ideal equalizer, the power flow of radiation leaving any small region of the area of the output aperture would be the same as the power flow from any other such small region of the output aperture. In a practical equalizer, these regions need not be infinitesmal, and the shape of the output aperture may be restricted. For example, one could specify an equalizer having a circular output aperture with the regions of interest of the output aperture all being concentric rings of equal area. The power flow through each concentric annular region must then be substantially the same as the power flow through any other such region.

An ideal equalizer should function regardless of the direction from which light enters its input aperture, but in a practical equalizer this is not necessary. An equalizer can be acceptable, even though there are certain directions of incident light for which the equalizer does not work, because it is possible simply to block light from entering the input aperture from those directions without thereby causing an unacceptable diminution of the total light energy throughput.

In one embodiment, an equalizer of the present invention is formed of an elongated, light transmissive element having an input and output aperture, the interior of the element being arranged so as to provide a progressively greater number of discrete light transmitting paths between the input and output aperture. In order to incur substantially equal light distribution at the termination of all of the paths at the common output aperture, at least part of each path is "leaky," i.e. can receive and transmit light to one or more adjacent parts. Thus, typically the input aperture of the equalizer is divided into two light paths of substantially equal cross sectional area, having a common interface. For some predetermined distance, the interface is leaky, preferably by being approximately 50% transmissive and 50% reflective. For the remainder of the distance between the input and output aperture, the interface no longer permits leakage or cross-talk between the transmissive paths on either side, and therefore is wholly reflective. Similarly, each of the original transmissive paths can be divided into smaller and smaller transmissive channels each characteristically having a leaky interface with an adjacent channel near the beginning of the transmissive path and a light impervious (preferably reflective) interface toward the end of the path. All exterior surfaces of the equalizer are wholly reflective in order to minimize absorptive attenuation and other power losses. One form of the device is shown particularly in FIG. 1 and typically comprises an elongated volume 20 formed of successive sections 22 and 24 of light-transmissive material. The term "light" as used herein is intended to include, where appropriate, ultra-violet and infra-red as well as visible radiation. Thus, for example the light-transmissive material of sections 22 and 24 typically is glass or clear, high molecular-weight polymer for visible radiation, alkali halides for infra-red radiation and the like, and with due consideration for the problems of supporting reflecting surfaces and of confining the transmissive material, can be one or more fluids. If reflective surfaces are self-supporting, the transmissive portions can even be a vacuum, thus providing an equalizer usable in spectral regions where transparent materials are not readily available. Each of sections 22 and 24 can be considered to be (and in fact can be constructed so as to possess) a plurality of flat, light-transmissive slabs having substantially parallel planar interfaces.

Thus, for example, one can consider that there is a plane A—A extending from a transparent end wall or input aperture 26 of section 22 so as to divide the latter into substantially equal halves or transmission channels to form a partially communicating interface between the two channels. Lying in plane A—A and extending substantially transversely to the general direction of light entering aperture 26, are a plurality of spaced apart reflective elements or strips 28 and 30 (only two being shown for the sake of convenience) so that for a distance $d_1$ extending inwardly from aperture 26, substantially one half of plane A—A is reflective and the other half of plane A—A is transmissive. Strips 28 and 30 can simply be formed of spaced-apart metallic foil ribbon sections which are clamped between a pair of light-transmissive slabs, or can be a deposited coating or the like.

Alternatively, a continuous film, typically of a dielectric half reflective and half transmissive, can also be made. However, any other arrangement, regular or random, of reflective portions and transmissive portions (which themselves may be regular or irregular in shape and size) is acceptable provided that such arrangement effectively is one-half transmissive and one-half reflective on the average. Starting at distance $d_1$ from input aperture 26 and extending the remainder of the length of section 22 to output aperture 32, plane A—A includes an entirely reflective surface 31 so that substantially all radiation appearing at output aperture 32 is divided into two parts. At distance $d_1$ however, the two halves of section 22 provided by dividing plane A—A are themselves each divided in half along planes B—B and C—C which preferably extend parallel to plane A—A, thereby subdividing the original transmission channels each into a corresponding pair of smaller transmission channels.

For a distance $d_2$ from the end of distance $d_1$, each of planes B—B and C—C is one-half reflective and one-half transmissive by the provision therein, for example, of spaced-apart reflective portions or strips such as 34, 36, 38 and 40. Again, the number, size and arrangement of reflective portions to be used in each plane is a matter of choice. From the end of distance $d_2$ to output aperture 32, planes B—B and C—C constitute entirely reflective portions 39 and 41 respectively.

Thus, it will be seen that planes A—A, B—B and C—C have, within the distance $d_2$, divided section 22 into four channels and consequently all of the light passing through section 22 into four distinct portions. Each of these latter channels is again divided in half by respective planes D—D, E—E, F—F and G—G which extend parallel to plane A—A and each of which, for a distance $d_3$, is one-half reflective and one-half transmissive by virtue of having a plurality of reflective strips such as 42, 44 and the like which extend transversely across section 22 from side to side of the latter. The process of dividing the channels in halves can be continued indefinitely.

It will be apparent that by the structure disclosed, the light coming from output aperture 32 of section 22 will be divided into at least $n$ parts where $(n-1)$ is the number of dividing planes, $n$ being a power of 2 equal to or greater than 2. By virtue of the fact that for some initial distance each of the planes is leaky because of being one-half reflecting and one-half transmissive, light entrant into input aperture 26 will tend to be evenly divided by each such plane. Thus it can be seen that to a fair approximation, the cross sectional area of output aperture 32 will be divided into $n$ area elements, each of which will have distributed therein approximately a fraction of the total input light, i.e. $1/n$. In order to maximize the transfer of the light from input aperture 26 to output aperture 32 with optimum division, the external surface of section 22 with the exception of the input and output apertures, is preferably also covered with a reflective surface. It will be appreciated that the approximate division of the light becomes more and more nearly exact as $n$ increases.

In some cases, equalization along a single direction, such as is provided by section 22, is adequate. Where equalization along two directions is required, section 22 may be followed by a similar section 24. Directly coupled to output aperture 32 is second section 24 (only a part of which is shown) which typically is another unit identical to section 22 in possessing a first plane H—H which is divided for a distance $d_4$ into one-half reflective and one-half transmissive surfaces, second planes J—J and K—K each of which corresponds to planes B—B and C—C of section 22 and so forth. Input aperture 50 of section 24 which corresponds to input aperture 26 of section 22, is directly coupled to output aperture 32, preferably so that no light leaks will occur, and with plane H—H extending along a line common to but inclined at an angle greater than 0° and less than 180° (preferably 90°) to plane A—A.

Figure 7:
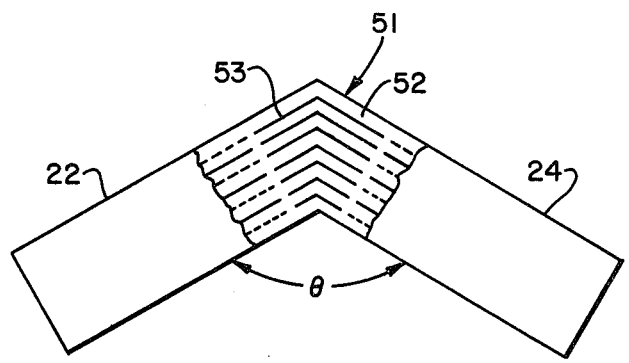
FIG. 7 is a perspective view, partly broken away of an alternative embodiment of an equalizer device similar to FIG. 1.

It will be appreciated that radiation entering the equalizer nearly parallel to the planes of section 22 will not be equalized. In most cases, an acceptable solution to this problem is simply to prevent light from entering too closely to a parallel with the planes of the equalizer, for example by turning the latter to an appropriate angle with respect to the light source. In applications where it is critical to minimize the range of angles of incidence of input radiation for which the equalizer does not work, the two sections 22 and 24 may be followed by a third (not shown) having its planes disposed at 45° to the planes of both sections 22 and 24. Alternatively, one can use two sections such as 22 coupled to one another, as shown in FIG. 7 such that the planes of one form a fixed dihedral angle with respect to the other, typically a shallow angle such as 170° or such. In order to insure a fixed path length, joint section 51 in which all of the transmission channels such as 52 are separated from one another by fully reflective surfaces 53 which permit no light leakage between channels, is provided to couple the output of one section such as 22 to the input of the other section such as 24.

Figure 2:
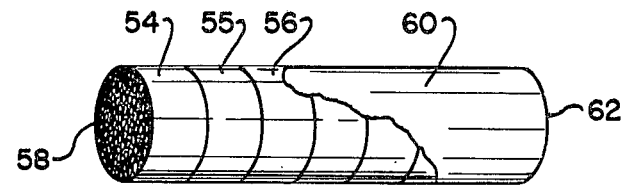
FIG. 2 is a perspective view, partly broken away, of another form of equalizer device of the present invention.

Referring now to FIG. 2 there will be seen an alternative embodiment of an equalizer of the present invention in the form of an elongated structure 52 formed of a plurality of stacked elements such as discs 54, 55, 56 and the like. It should be understood that the discs, of which disc 54 will be described as exemplary, need not have circular cross-sections, and indeed the cross-section configuration is largely a matter of choice. Disc 54 however has two substantially planar faces only one of which, face 58, is shown. Both of these planar faces are provided with a light diffusing or scattering surface such as a ground or sand-blasted finish. Disc 54 is formed of a material transparent to a desired band of wavelengths and therefore can be formed of glassy materials, crystals or the like. The external cylindrical surface of structure 52 is preferably covered or coated with a material 60 (shown broken away) which is highly reflective to the wavelengths which the transparent material of the discs will transmit. The planar faces of adjacent discs are preferably in contact with one another.

Light entering one end of structure 52, as the face 58, is transmitted through the entire structure to the opposite end and is scattered at each disc surface. Light leakage through the cylindrical periphery of the structure is minimized by the provision of the coating of material 60. How evenly the structure of FIG. 2 distributes the intensity of light across its output aperture, as at end 62, depends upon the number of scattering surfaces interposed between output aperture 62 and input face 58. However inasmuch as a portion of the light entering through face 58 will be back-scattered, the equalizer of FIG. 2 cannot operate at a transmission efficiency nearly as high as that of the equalizer of FIG. 1.

In an alternative embodiment of FIG. 2, particularly useful in equalizing the distribution of an input beam of infrared radiation and which somewhat minimizes the inherent scattering losses, the discs are formed by pressing a mixed salt sample such as KBr and CsI to a point short of complete transparency, i.e., arresting compression before the powdered crystalline material becomes transparent. The salts are initially in powder form and to achieve optimum mixing, the powder particles should be in the 50 to 100$\mu$ range in diameter. A pellet of mixed material will provide scattering because the two salts have slightly different indices of refraction and the amount of scattering achieved can be controlled by the proportion of the salts pressed into a disc. The matrix material can have either higher or lower index of refraction than the second material. Equalizers can be formed of a plurality of pellets, not necessarily all with the same scattering properties, either in direct contact with one another or separated from one another by various appropriate distances by light conducting means such as light pipes.

Alternatively discs or longer rods of scattering material can be made from mixed salt samples formed into a solid by heating under pressure at a temperature a few hundred degrees C. below the melting point of the salts and then cooling. By varying the time that the mixture is held near the melting point, controlled partial solution of one component in the other will occur. This will produce a slowly varying change or gradiant of the index of refraction at the interfaces between the components. By controlling the size of the scattering particles and the index of refraction gradiant, one can manufacture a diffuser that will scatter predominantly in the forward direction into a relatively narrow cone of rays and hence provide high throughput. Mixtures of KBr and NaCl are well suited for this purpose because of their similar melting points and indices of refraction; however, there are many choices of material.

In yet another alternative, the discs of FIG. 2 can be mixed so that fully IR-transparent discs or light pipes are sandwiched between discs which scatter.

Figure 3:
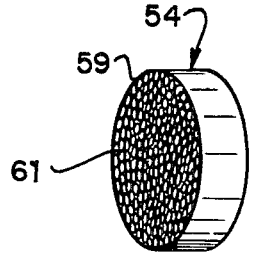
FIG. 3 is a perspective view of a cylindrical element useful in yet another form of equalizer of the present invention.

An alternative form of cylindrical element or disc such as 54 is useful in a stacked array such as shown in FIG. 2 to form an equalizer is shown in FIG. 3. Disc 54 of FIG. 3 simply is a transparent element of an infrared transmitting material such as pure KBr, having on at least one plane surface 59 thereof, a refractive pattern such as a plurality of lenticules 61, much in the nature of a "fly's eye." Such discs diffuse by refracting rather than scattering and can form an efficient equalizer.

In any of the above-described infrared equalizers, it is desirable that the exterior surface be mirrored for IR reflection as by coating with specular aluminum. In one particularly desirable form, coating material 60 is a plural ply coating formed of an inner layer of aluminum precoated on polyethylene terephthalate sheet, all enclosed in a heat shrunk polymeric tube. The technique for making such an equalizer simply involves wrapping a selected stack of appropriate discs in the aluminized sheet, slipping the wrapped discs into the heat shrinkable tube and gently heating the latter sufficiently to shrink the tube down so as to tightly press the aluminum surface around the periphery of the equalizer while providing a mechanical bond which holds all of the discs in the equalizer in an appropriate position.

Controlled scattering throughout a volume can be achieved by use of a powdered infrared transmitting material immersed in a transparent liquid having an index of refraction slightly different from that of the powder in the spectral region of interest. By controlling powder particle size and the difference in the indices of refraction, one can control the scattering properties of the mixture. One can for example, produce a system having predominantly forward scattering into a relatively narrow cone and thus produce an equalizer with high throughput.

Figure 4:
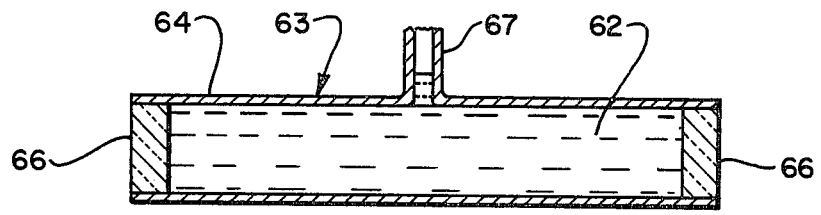
FIG. 4 is a cross-sectional view of still another form of equalizer of the present invention.

One embodiment of such an equalizer is shown in FIG. 4 wherein a powder-liquid system 62 is contained in cylindrical tube 63 with highly reflecting inner walls 64. The ends of the tube are closed or sealed with infrared windows 66. To be sure that there are no air bubbles, there is a side port 67 through which excess liquid can be introduced.

Alternately the equalizer of FIG. 4 can be formed of short sections of powder-liquid spaced with sections containing liquid only or transparent gas. In all cases the cell section containing powder is preferably packed full so that there is no settling.

For the infrared, the liquids useful in system 62 can be $CCl_4$ and $C_2Cl_4$ with indices of refraction in the visible of 1.46 and 1.50. Powders for use in system 62 can be BaF and KCl with indices in the visible of 1.47 and 1.50 respectively. By mixing the two liquids one can get almost any desired index match in that narrow range. There are obviously other liquids and powders covering other ranges.

Figure 5:
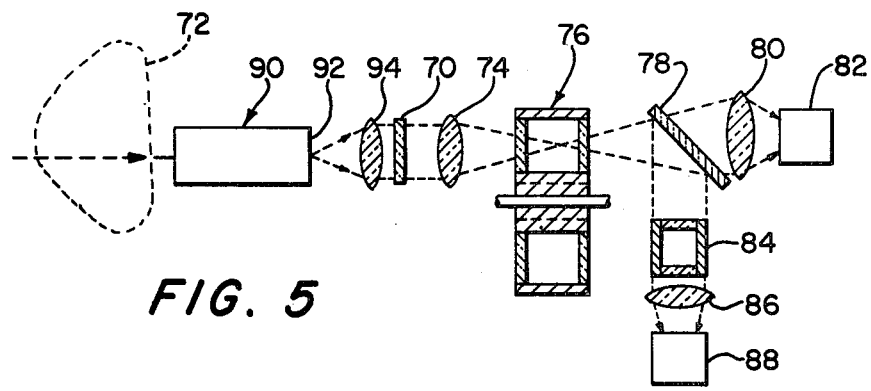
FIG. 5 is a schematic view of a correlation spectrometer employing the principles of the present invention.

As shown in FIG. 5, the equalizer of the present invention finds particular utility in a non-dispersive cross correlating spectrometric system such as the correlation spectrometers of the type described in the patents to Blau, Jr. and Schuman earlier identified. Thus, the spectrometer of FIG. 5, basically employs a scheme described in detail in the Blau, Jr. U.S. Pat. No. 3,723,731 in having an optical filter 70, preferably an interference filter, which provides a very narrow band pass, so as to be capable of isolating a band of frequencies within the absorption band of gas to be detected due to radiation passing through sample region 72. Light which has passed through filter 72 is then focussed by lens system 74 and is caused to traverse alternately and in rapid sequence each of a plurality of cells shown as an array 76. Light which has passed through a respective cell of array 76 is split by beam splitter 78 into two beams. A first of the beams is directed by lens 80 to radiant energy detector 82 such as an infrared-sensitive bolometer. The other of the beams is transmitted through reference cell 84 which contains a gas mixture with the same total and partial pressures as a gas mixture in one of the cells of array 76. Light transmitted through cell 84 is then focused by lens 86 on to radiant energy detector 88 which serves, in the same manner as does detector 82, to convert incident radiant energy into electrical signals.

It will be seen that in the device of FIG. 5, equalizer 90, which can take any of the forms heretofore described, is provided in the path of radiation which has traversed sample region 72. Output aperture 92 of equalizer 90 is disposed at the focus of a collimating system such as lens 94, lens 94 being disposed so that its collimated output is incident substantially perpendicularly to the mean plane of interference filter 70. If however, the equalizer used is a divider-type such as is shown in FIG. 1 it is desirable, to block the center of transfer lens 74 so that rays traversing equalizer 90 "straight-through" are not used.

The system of FIG. 5 will operate substantially as described in the aforesaid U.S. Pat. No. 3,723,731 insofar as the sequence of parts from filter 70 through array 76 to detectors 80 and 88 is concerned. However, the provision of equalizer 90 and collimator 94 in sequence as elements preceeding the interference filter 70, confers upon the system as reduced sensitivity to variation in the distribution of input light from sample region 72. For such purposes, other equalizers can also be used if perhaps not as satisfactorily as the equalizers heretofore described. For example, one can employ a kaleidoscope provided that the "straight through" rays are also blocked, or a torsional light conductor as described in U.S. Pat. No. 3,752,561, or bent fiber optics or the like.

Figure 6:
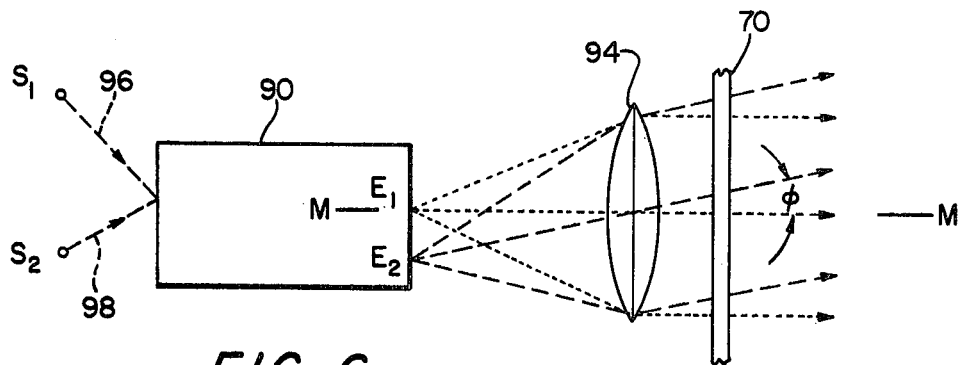
FIG. 6 is a diagram partly in block form, illustrating the principles of the equalizer device of the present invention.

This insensitivity of the system to variations in angular input and intensity can be explained with reference to FIG. 6 Two exemplary light sources are shown as $S_1$ and $S_2$ having different radiant intensities, and each providing input light beams 96 and 98 with different respective angular orientations. Light beams 96 and 98 enter equalizer 90 which, as heretofore explained, has an exit aperture area, each area element of which provides substantially the same light intensity as each other area element thereof, regardless of the distribution characteristics of the input beam of the device. Two such area elements are identified as $E_1$ and $E_2$, the former of which lies on the optical axis M—M of collimating lens 94, the latter being located off-axis. Thus, for source $S_1$ by definition the light intensities $I_{E1}$ and $I_{E2}$ provided respectively at $E_1$ and $E_2$. are equal. Inasmuch as $E_1$ lies on the optical axis of lens 94 light from $E_1$ when collimated by lens 94 is projected in rays (shown as dotted lines) parallel to axis M—M of the lens. Lens 94 also collimated light from $E_2$ and projects it in rays (shown as dashed lines) forming some angle $\phi$ with optical axis M—M. But because $i_{E1} = I_{E2}$ the amount of energy passing through filter at $\phi$ is the same as when $\phi = 0$. These considerations are exactly the same for source $S_2$ (except of course that the energy I at any area element at the output of equalizer may have different values for $S_1$ than for $S_2$). One can then state that the total energy emitted across the output aperture of equalizer 90 has precisely the same configuration regardless of the angular distribution and the intensity value of the input light to the equalizer. Because the filter then sees the same energy distribution although the energy amplitude may be different, the filter passband remains invariant with respect to the input angles and intensity distribution of the input light to the system. The system will still work even if the two intensities are not equal provided that they have the same relationship to both sources. However, for equalizers that produce an output intensity distribution that is independent of the distribution of the incident light, that output intensity distribution is ordinarily uniform.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. Method of making a light equalizer comprising the steps of selecting powdered crystalline material capable of being compressed to form a body transparent to selected wavelengths of light, compressing said material and arresting compression at a point short of complete transparency at said wavelengths so as to provide a plurality of light scattering centers at said wavelengths throughout the bulk of said body;

forming a stack in which a plurality of said bodies are disposed along a common axis; and covering with an internally reflective coating the exterior surfaces of said stack except for the two axial ends thereof said step of covering including the steps of wrapping said stack in a metallized sheet, positioning the wrapped stack within a heat-shrinkable tube, and heating said heat-shrinkable tube so as to shrink said tube sufficiently to press said metallized sheet around the periphery of said stack and to form a mechanical bond which holds said plurality of bodies of said stack along said common axis.

2. A method of making a light equalizer comprising the steps of selecting powdered crystalline material capable of being compressed to form a body transparent to selected wavelengths of light, compressing said material and arresting compression at a point short of complete transparency at said wavelengths so as to provide a plurality of light scattering centers at said wavelengths throughout the bulk of said body;

forming a stack in which a plurality of said bodies are disposed along a common axis; and covering with an internally reflective coating the exterior surfaces of said stack except for the two axial ends thereof.

* * * * *